May 28, 1940.  T. MOSLEY  2,202,116
DEVICE FOR CLEANING WASTE PIPES
Filed Jan. 22, 1940
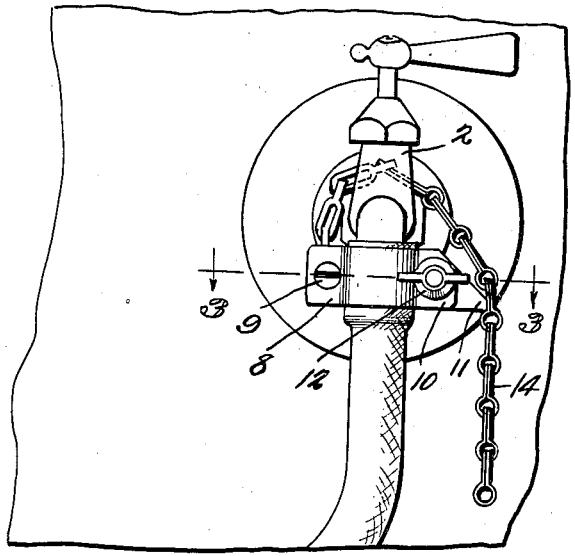
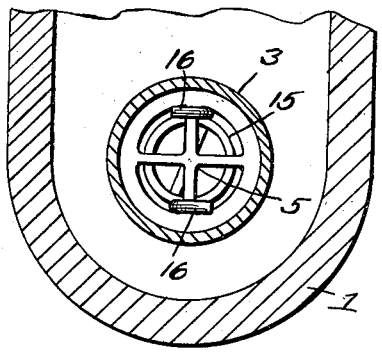
Fig. 2.
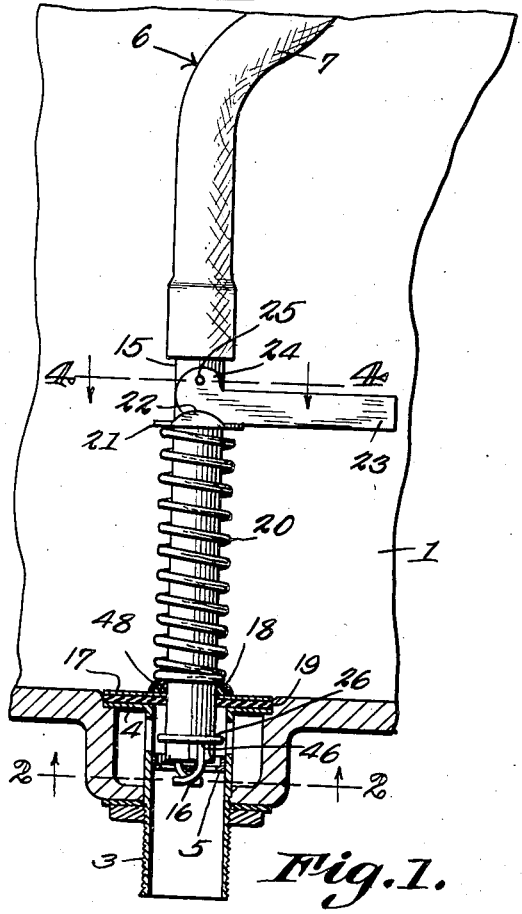
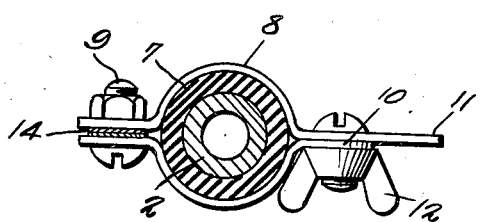
Fig. 3.
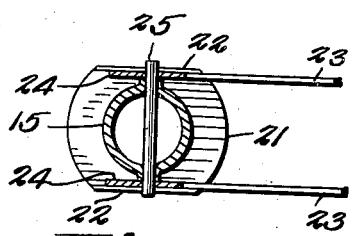
Fig. 4.
Fig. 1.
Thomas Mosley
INVENTOR.
BY *C. A. Snow & Co.*
ATTORNEYS.

Patented May 28, 1940

2,202,116

UNITED STATES PATENT OFFICE 2,202,116

DEVICE FOR CLEANING WASTE PIPES

Thomas Mosley, Lawton, Okla.

Application January 22, 1940, Serial No. 315,081

3 Claims. (Cl. 285—44)

Generally stated, this invention aims to provide novel means for forcing an obstruction out of the waste pipe of a sink, by hydraulic pressure. More specifically, one object of the invention is to provide novel means for securing the pressure conduit to a faucet, and another object of the invention is to provide novel means for anchoring the lower end of the conduit in the outlet of a sink.

Fig. 1 shows in elevation, a device constructed in accordance with the invention, assembled with a sink and spigot, some parts being broken away, and other parts being in section;

Figs. 2, 3 and 4 are cross sections taken, respectively, on the lines 2—2, 3—3 and 4—4 of Fig. 1.

The numeral 1 marks a sink into which a faucet 2 discharges, a tubular outlet 3 being secured in the bottom of the sink, the outlet 3 having a top flange 4, and there being a screen or grating 5 fixed in the outlet 3.

The numeral 6 designates a pressure conduit, including a flexible hose 7, the upper end of which may be slipped over the spout of the faucet 2. A water tight joint between the hose 7 and the spout of the faucet 2 is secured through the instrumentality of a two part clamp, the constituent members of which are united by a pivot bolt 9 or otherwise.

One member of the clamp 8 has a short arm 10, and the other member of the clamp has a long arm 11, terminating in a point. The clamp 8 is tightened about the hose 7 by means of a wing bolt 12 in the arms 10 and 11.

The clamp 8 holds the hose 7 on the spout of the faucet 2 tightly enough to make an hermetic joint, but, in many instances, not securely enough to keep the hose in place, because there is a heavy pressure in the hose until the obstruction in the outlet of the sink is dislodged. In order to hold the parts securely assembled, one end of a flexible element 14, such as a chain, is engaged with the pivot bolt 9, between the members of the clamp 8, the chain being extended over the faucet 2, and one link of the chain being engaged with the point of the long arm 11 of one member of the clamp 8.

The upper end of a rigid tube 15, generally made of metal, is secured in the lower end of the hose 7 and at its lower end, the tube is provided with depending, oppositely extending claws 16, adapted to be engaged with the screen 5 in the outlet 3. This is done by lowering the tube 15 to the position of Fig. 1, and giving it a partial turn.

The tube 15 can slide through a rigid, disk-like foot 17, below which is located a renewable, compressible gasket 19.

An inverted, cup-shaped holder 18 is slidable on the tube 15 and contains a packing 48, which prevents upward escape of water under pressure, at the place where the tube 15 passes through the foot 17 and the gasket 19.

A coiled compression spring 20 is disposed about the tube 15, the lower end of the spring finding an abutment against the holder 18 on the foot 17 and exerting pressure on the foot 17. The upper end of the spring 20 engages an abutment disk 21, slidable on the tube 15. Opposed portions of the disk 21 are turned up to form ears 22.

The numeral 23 marks a U-shaped lever, the arms of which terminate in cams 24, adapted to exert pressure on the disk 21, between the ears 22. The ears 22 keep the arms of the lever 23 from spreading, and the lever, therefore, can be made out of light metal. The cams 24 turn on a pivot member 25, such as a pin secured in the tube 15 and extending thereacross. The pin 25 forms a fulcrum for the lever 23.

The lever 23 can be turned up from the position of Fig. 1, thereby relieving pressure on the spring 20 and the claws 16 can be hooked easily into the screen 5. Thereafter, the lever 23 can be swung down into the horizontal position of Fig. 1, thereby putting the spring 20 under increased pressure, to hold the claws 16 engaged with the grating 5, to press the yieldable packing 48 in the holder 18 tightly upon the foot 17 and about the tube 15, and to press the gasket 19 tightly against the flange 4 of the outlet 3, water tight joints being effected. When the faucet 2 is opened, water pressure will dislodge an obstruction in the outlet, in a well known manner.

It is to be noted that the upright portions of the claws or anchorage elements 16 are secured at 46 on the outside of the tube 15. They form, therefore, an abutment for a washer 26 slidably mounted on the tube 15. The purpose of this construction is to prevent the spring 20, the foot 17 and the gasket 19 from dropping off the tube 15 when the device is not in use. The claws 16 serve two purposes, in that they constitute means whereby the tube 15 can be assembled with the screen 5 and in that, also, they prevent the washer 26 and parts above it from sliding off the tube 15.

What is claimed is:

1. In a device for dislodging an obstruction from a clogged waste pipe, a pressure conduit, pipe-engaging anchorage means on the lower portion of the conduit, a sealing foot through which the conduit is slidable, a lever including a cam pivotally mounted on the conduit, and a compression spring surrounding the conduit and interposed between the cam and the foot.

2. In a device for dislodging an obstruction from a clogged waste pipe, a pressure conduit, a sealing foot through which the conduit is slidable, an inverted, cup-shaped holder through which the conduit is slidable, a packing in the holder and engaging the foot and the conduit, to effect a tight joint where the conduit passes through the foot, a compression means movable on the conduit at the will of an operator, a compression spring interposed between said means and the holder, and pipe-engaging anchorage means on the lower portion of the conduit.

3. In a device for dislodging an obstruction from a clogged waste pipe, a pressure conduit, pipe-engaging anchorage means secured to the outside of the lower portion of the conduit, a sealing foot through which the conduit is slidable, and a compression spring on the conduit and exerting pressure on the foot, the pipe-engaging anchorage means forming a stop which prevents the spring and the foot from sliding off the conduit when the device is not in use.

THOMAS MOSLEY.